(12) United States Patent
Alonso-Miralles

(10) Patent No.: US 10,994,856 B2
(45) Date of Patent: May 4, 2021

(54) STRUCTURAL PANEL WITH SPLICE JOINT BETWEEN ADJACENT CORE STRUCTURES

(71) Applicant: Rohr, Inc., Chula Vista, CA (US)

(72) Inventor: Jose S. Alonso-Miralles, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 590 days.

(21) Appl. No.: 15/784,902

(22) Filed: Oct. 16, 2017

(65) Prior Publication Data

US 2019/0112066 A1 Apr. 18, 2019

(51) Int. Cl.

| B32B 3/12 | (2006.01) |
|---|---|
| F16B 5/01 | (2006.01) |
| B64C 1/12 | (2006.01) |
| F02K 1/34 | (2006.01) |
| F02C 7/24 | (2006.01) |
| B32B 3/06 | (2006.01) |
| B29C 65/00 | (2006.01) |
| F02C 7/045 | (2006.01) |
| F16S 1/00 | (2006.01) |

(Continued)

(52) U.S. Cl.
CPC ........ B64D 33/06 (2013.01); B29C 66/12463 (2013.01); B29C 66/30325 (2013.01); B29C 66/7212 (2013.01); B32B 3/06 (2013.01); F02C 7/045 (2013.01); F02C 7/24 (2013.01); F16S 1/00 (2013.01); B29L 2031/3076 (2013.01); B32B 2250/40 (2013.01); B32B 2307/10 (2013.01); B32B 2605/18 (2013.01); B64C 2001/0072 (2013.01); F05D 2230/23 (2013.01); F05D 2260/96 (2013.01); F16B 11/006 (2013.01)

(58) Field of Classification Search
CPC ........ B29C 66/12463; B29C 66/12464; B29C 66/12461; B29C 66/124; B29C 66/02; B29C 66/10; B29C 66/01; B29C 65/00; B64D 33/06; B32B 3/02; B32B 3/06; B32B 3/12; F02C 7/045; F02C 7/24; F02K 1/82; F02K 1/78; F16B 5/01; F16B 5/00; B64C 1/12
See application file for complete search history.

(56) References Cited

U.S. PATENT DOCUMENTS

| 5,041,323 A | 8/1991 | Rose et al. |
| 5,776,579 A * | 7/1998 | Jessup ...................... B32B 3/12 428/73 |

(Continued)

FOREIGN PATENT DOCUMENTS

| CN | 105128412 | 8/2015 |
| EP | 2896498 | 7/2015 |

(Continued)

*Primary Examiner* — Edgardo San Martin
(74) *Attorney, Agent, or Firm* — Getz Balich LLC

(57) ABSTRACT

A structural panel is provided that includes a first core structure and a second core structure. The first core structure is configured with a first endwall and a plurality of first cavities that extend vertically through the first core structure. The second core structure is configured with a second endwall and a plurality of second cavities that extend vertically through the second core structure. The second core structure is laterally bonded to the first core structure at a complex splice joint between the first endwall and the second endwall.

18 Claims, 10 Drawing Sheets

(51) Int. Cl.
*F16B 5/00* (2006.01)
*B64C 1/00* (2006.01)
*B29L 31/30* (2006.01)
*F16B 11/00* (2006.01)

(56) References Cited

U.S. PATENT DOCUMENTS

| | | | |
|---|---|---|---|
| 5,938,875 A * | 8/1999 | Jessup | B32B 3/12 |
| | | | 156/79 |
| 7,296,655 B2 * | 11/2007 | Costa | F02C 7/045 |
| | | | 181/210 |
| 8,469,146 B2 | 6/2013 | Bornert-Dano | |
| 8,474,218 B2 | 7/2013 | Hodgson | |
| 8,579,076 B2 * | 11/2013 | Ayle | F02C 7/045 |
| | | | 181/210 |
| 8,652,606 B2 * | 2/2014 | Griess | B29C 66/721 |
| | | | 428/60 |
| 8,985,513 B2 | 3/2015 | Dean et al. | |
| 9,211,618 B2 * | 12/2015 | Hethcock | B25B 11/002 |
| 9,592,918 B2 * | 3/2017 | Yu | B64D 33/06 |
| 9,623,621 B2 * | 4/2017 | Taylor | B32B 3/12 |
| 10,195,836 B2 * | 2/2019 | Pierce | B32B 37/146 |
| 2006/0251847 A1 * | 11/2006 | Hethcock | B29C 66/221 |
| | | | 428/58 |
| 2008/0086965 A1 * | 4/2008 | Metz | E04C 2/365 |
| | | | 52/309.9 |
| 2014/0134379 A1 * | 5/2014 | Harrison | B32B 3/06 |
| | | | 428/58 |
| 2015/0367953 A1 | 12/2015 | Yu et al. | |
| 2016/0144592 A1 | 5/2016 | Douglas | |
| 2017/0122351 A1 | 5/2017 | Engquist | |

FOREIGN PATENT DOCUMENTS

| | | | |
|---|---|---|---|
| GB | 1406844 | 9/1975 | |
| WO | WO-2008148537 A1 * | 12/2008 | B29C 66/1142 |
| WO | WO-2012090518 A1 * | 7/2012 | B32B 27/32 |

* cited by examiner

STRUCTURAL PANEL WITH SPLICE JOINT BETWEEN ADJACENT CORE STRUCTURES

BACKGROUND

1. Technical Field

This disclosure relates generally to structural panels and, more particularly for example, to structural panels for attenuating sound generated by an aircraft propulsion system.

2. Background Information

A structural panel may be configured to attenuate sound generated by an aircraft propulsion system. Various structural panel types and configurations are known in the art. While these known structural panels have various advantages, there is still room in the art for improvement.

SUMMARY OF THE DISCLOSURE

According to an aspect of the present disclosure, a structural panel is provided that includes a first core structure and a second core structure. The first core structure is configured with a first endwall and a plurality of first cavities that extend vertically through the first core structure. The second core structure is configured with a second endwall and a plurality of second cavities that extend vertically through the second core structure. The second core structure is laterally bonded to the first core structure at a complex splice joint between the first endwall and the second endwall.

According to another aspect of the present disclosure, another structural panel is provided that includes a first core structure and a second core structure. The first core structure includes a first endwall and a plurality of first cavities. The first cavities extend vertically through the first core structure. The first endwall is configured with a plurality of first protrusions arranged in a vertically extending array. The second core structure includes a second endwall and a plurality of second cavities. The second cavities extend vertically through the second core structure. The second endwall is configured with a plurality of second protrusions arranged in a vertically extending array. The second protrusions are meshed together with the first protrusions at a splice joint that laterally attaches the second core structure to the first core structure.

The panel may also include a first skin, a second skin and a core. The first skin may include a plurality of perforations. The core may be vertically between and connected to the first skin and the second skin. The core may include the first core structure and the second core structure. The first cavities may extend vertically through the first core structure between the first skin and the second skin. At least one of the first cavities may be fluidly coupled with one or more of the perforations in the first skin. The second cavities may extend vertically through the second core structure between the first skin and the second skin. At least one of the second cavities may be fluidly coupled with one or more of the perforations in the first skin.

The panel may be configured as a sandwich panel.

The first core structure may also include a corrugated ribbon, a first wall and a second wall. The corrugated ribbon may include a plurality of baffles and a plurality of porous septums. The baffles and the porous septums may be between and connected to the first wall and the second wall. Each of the porous septums may be laterally between a respective adjacent pair of the baffles.

At least one of the first core structure or the second core structure may be configured as a monolithic body.

The first endwall may include a first protrusion that extends laterally into a first recess in the second endwall. The second endwall may include a second protrusion that extends laterally into a second recess in the first endwall. The second protrusion may be vertically displaced from the first protrusion.

The second protrusion may be vertically adjacent and engage the first protrusion.

The first protrusion may have a first sectional geometry. The second protrusion may have a second sectional geometry that is substantially a mirror image of the first sectional geometry.

The first protrusion may have a first sectional geometry. The second protrusion may have a second sectional geometry that is different than the first sectional geometry.

The first endwall may also include a second protrusion that extends laterally into a second recess in the second endwall. The second protrusion may be vertically displaced from the first protrusion.

The first protrusion may have a rectangular sectional geometry.

The first protrusion may have a triangular sectional geometry.

At least one of the first endwall or the second endwall may be configured from or otherwise include thermoplastic material.

At least one of the first core structure or the second core structure may be configured as a unitary body.

The second core structure may be laterally bonded, in a first direction, to the first core structure at the complex splice joint. The first core structure may also include a corrugated ribbon, a first wall and a second wall. The corrugated ribbon may include a plurality of baffles and a plurality of porous septums. The baffles and the porous septums may be laterally, in a second direction, between and connected to the first wall and the second wall. Each of the porous septums may be laterally, in the first direction, between a respective adjacent pair of the baffles. The corrugated ribbon, the first wall and the second wall may each extend laterally, in the first direction, to and is connected to the first endwall.

The second core structure may be laterally bonded, in a first direction, to the first core structure at the complex splice joint. The first core structure may also include a corrugated ribbon and a first wall. The corrugated ribbon may include a plurality of baffles and a plurality of porous septums. The baffles and the porous septums may be laterally, in a second direction, between and connected to the first endwall and the first wall. Each of the porous septums may be laterally, in the first direction, between a respective adjacent pair of the baffles.

The structural panel may be configured as an acoustic panel of an aircraft propulsion system nacelle.

The foregoing features and the operation of the invention will become more apparent in light of the following description and the accompanying drawings.

DETAILED DESCRIPTION

Figure 1:
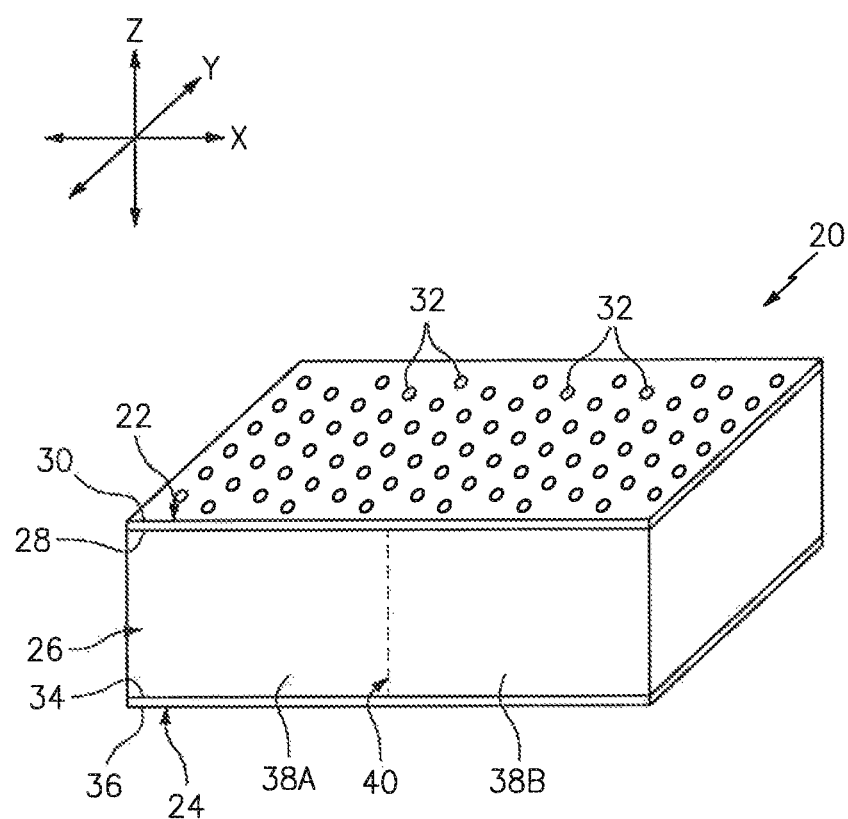
FIG. 1 is a schematic perspective illustration of an acoustic structural panel.

FIG. 1 schematically illustrates an exemplary structural panel 20 (e.g., a sandwich panel) configured as an acoustic sound attenuating panel. This structural panel 20, for example, may be configured to attenuate noise generated by an aircraft propulsion system such as, for example, a turbofan propulsion system or a turbojet propulsion system. With such a configuration, the structural panel 20 may be configured to form part of a nacelle of the propulsion system. The structural panel 20, for example, may be configured as or with an inner or outer barrel, a translating sleeve, a blocker door, etc. Alternatively, the structural panel 20 may be configured with another component/structure of the aircraft such as its fuselage or a wing. Furthermore, the structural panel 20 may be configured to also or alternatively attenuate aircraft related noise other than that generated by the propulsion system. The structural panel 20 of the present disclosure, however, may alternatively be configured for non-aircraft applications and/or non-sound suppression applications.

The structural panel 20 of FIG. 1 extends laterally in an x-axis direction along an x-axis. The structural panel 20 also extends laterally in a y-axis direction along a y-axis. Note, the term "lateral" is used herein to describe panel directions along the x-y plane. For ease of description, however, the x-axis lateral direction may be referred to below as a "longitudinal" direction and the y-axis lateral direction may be referred to below as a "transverse" direction.

The structural panel 20 extends vertically along a z-axis. Note, the term "vertical" is used herein to describe a depthwise panel direction and is not limited to a gravitational up/down direction.

For ease of illustration, the x-y plane is shown as a generally flat plane in FIG. 1. However, in other embodiments, the x-y plane and, thus, the structural panel 20 may be curved and/or follow an undulating geometry; e.g., complex 3D curvature. For example, the x-y plane and, thus, the structural panel 20 may be arcuate, cylindrical, conical, or tapered with or without radial undulations. In such embodiments, the vertical direction (e.g., the z-axis) is defined relative to a position of interest on the x-y plane. For example, on a spherical x-y plane, the vertical direction (e.g., the z-axis) is a radial direction.

The structural panel 20 includes a porous first skin 22 (e.g., a perforated exterior skin), a solid non-porous second skin 24 (e.g., a non-perforated interior skin) and a cellular multi-segment core 26. Note, the term "porous" is used herein to describe a body with perforations and/or open cell pores that enable flow of gas as well as sound waves through the body. The term "non-porous" is used herein to describe a body with a configuration that prevents flow of gas and/or sound waves through the body; e.g., a body without perforations or open cell pores.

Briefly, the multi-segment core 26 is disposed and extends vertically between the first skin 22 and the second skin 24. The multi-segment core 26 is also connected to the first skin 22 and the second skin 24. The multi-segment core 26, for example, may be welded, brazed, fused, adhered or otherwise bonded to the first skin 22 and/or the second skin 24.

The first skin 22 may be configured as a relatively thin sheet or layer of material that extends longitudinally and transversely along the x-y plane. This first skin 22 material may include, but is not limited to, a metal, a polymer (e.g., thermoplastic or thermoset), a fiber reinforced matrix (e.g., fiberglass composite, carbon fiber composite, aramid fiber composite, etc.), or a combination thereof. The first skin 22 extends vertically between opposing side surfaces 28 and 30. The first skin 22 includes a plurality of perforations 32; e.g., apertures such as through-holes. Each of these perforations 32 extends generally vertically through the first skin 22 between the side surfaces 28 and 30. However, in other embodiments, the first skin 22 may be configured without the perforations 32 where, for example, the structural panel 20 is not configured for sound attenuation.

The second skin 24 may be configured as a relatively thin sheet or layer of (e.g., continuous and uninterrupted) material that extends longitudinally and transversely along the x-y plane. This second skin 24 material may include, but is not limited to, a metal, a polymer (e.g., thermoplastic or thermoset), a fiber reinforced composite (e.g., fiberglass composite, carbon fiber composite, aramid fiber composite, etc.), or a combination thereof. The second skin 24 material may be the same as or different than the first skin 22 material. The second skin 24 extends vertically between opposing side surfaces 34 and 36.

The multi-segment core 26 extends longitudinally and transversely along the x-y plane. The multi-segment core 26 extends vertically between opposing core sides, which core sides are respectively abutted against the side surface 28 of the first skin 22 and side surface 34 of the second skin 24.

The multi-segment core 26 includes at least a first segment and a second segment. Each of these segments is formed as a discrete core structure 38A and 38B (generally referred to as "38"). These discrete core structures 38A and 38B are then attached (e.g., bonded) to one another at a splice joint 40 (or multiple splice joints) to provide the multi-segment core 26. Various splicing techniques may be used for attaching the first core structure 38A to the second core structure 38B and are discussed below in further detail after a general discussion of exemplary first core structure 38A and the second core structure 38B.

Figure 2:
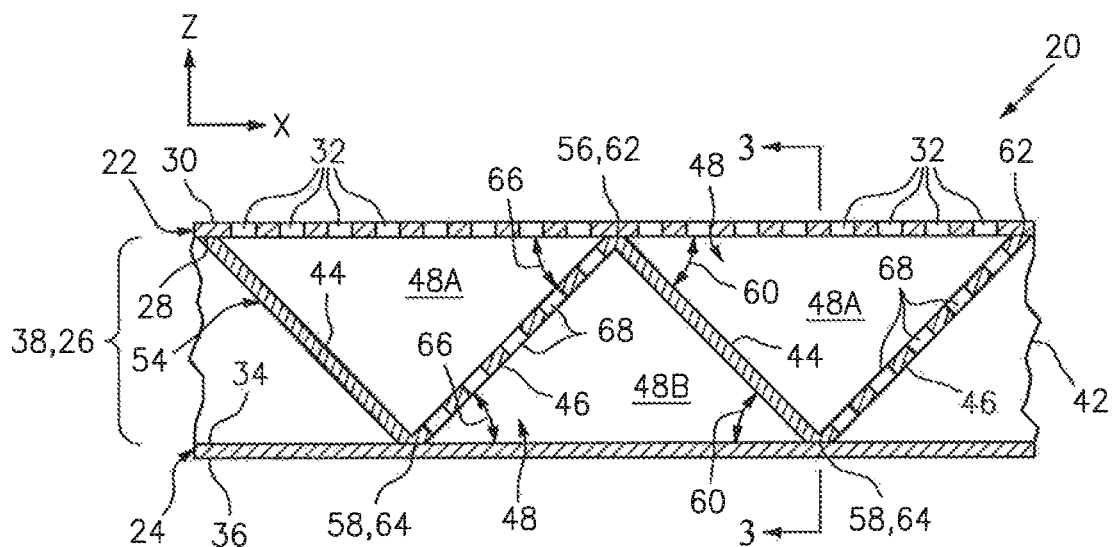
FIG. 2 is a sectional illustration of a portion of the structural panel.
Figure 3:
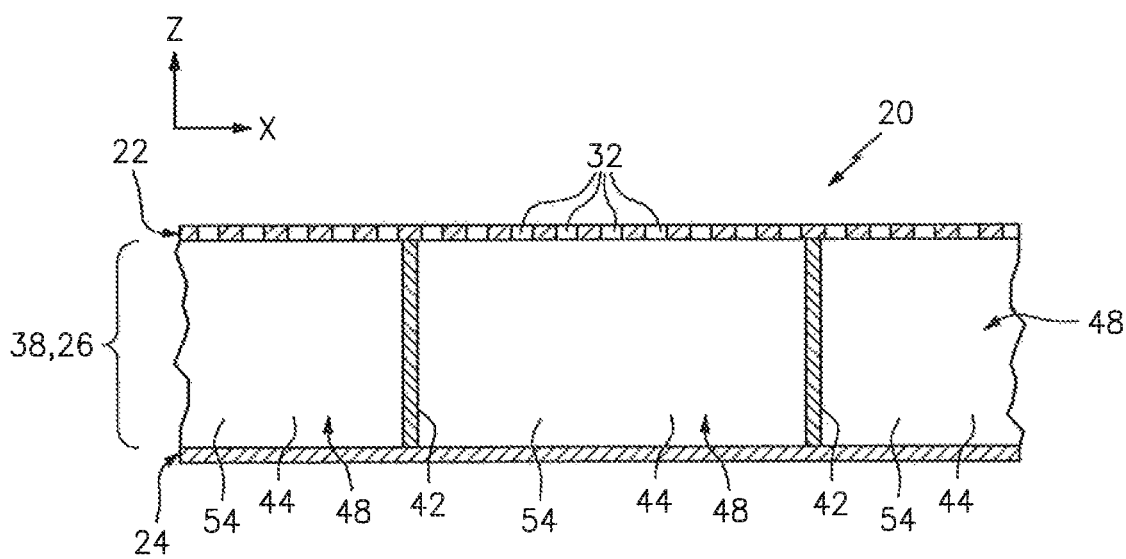
FIG. 3 is a sectional illustration of the structural panel portion of FIG. 2 taken along the line 3-3.
Figure 4:
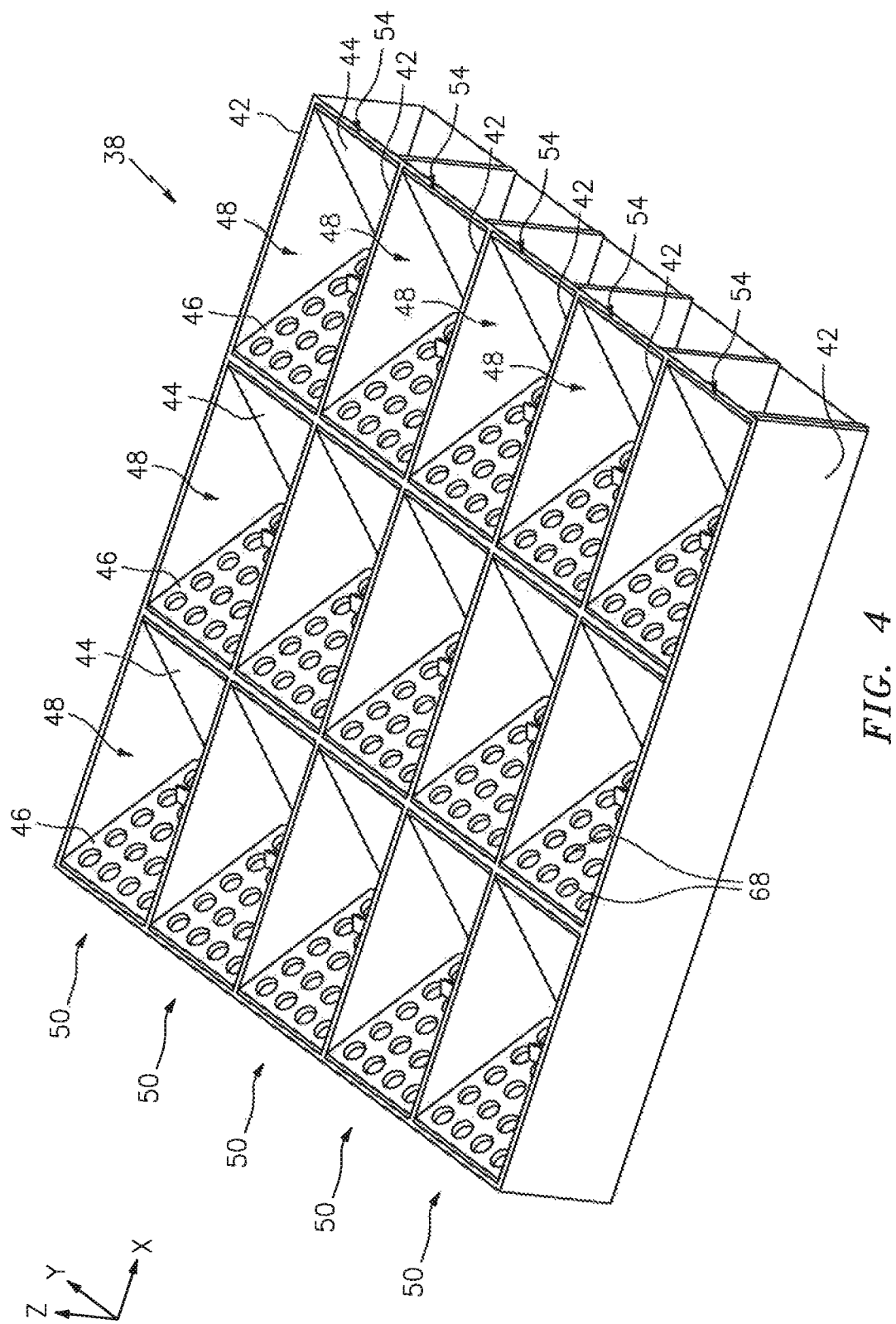
FIG. 4 is a perspective illustration of a portion of a core structure.

FIGS. 2-4 illustrate an exemplary core structure which is representative of an embodiment of the first core structure 38A and an embodiment of the second core structure 38B. The first and second core structures 38A and 38B of the present disclosure, however, are not limited to such an exemplary configuration. Furthermore, the first and the second core structures 38A and 38B of the present disclosure are not limited to having like configurations.

The core structure 38 of FIGS. 2-4 includes a plurality of non-porous walls 42, a plurality of non-porous baffles 44 and a plurality of porous septums 46 (e.g., perforated septums). These core components 42, 44 and 46 are arranged together to configure the multi-segment core 26 as an open cavity (e.g., open cell) structure. This open cavity structure forms a plurality of cavities 48 (see also FIG. 6) vertically between the first skin 22 and the second skin 24. These cavities 48 may be arranged in a plurality of linear arrays 50 (see FIG. 4), where each array 50 extends longitudinally and parallel to the non-porous walls 42. Each of the cavities 48 may be fluidly coupled with one or more respective perforations 32 in the first skin 22 (see FIGS. 2 and 3).

Each of the walls 42 extends vertically between the first skin 22 and the second skin 24. Each of the walls 42 extends longitudinally along at least one array of the cavities 48 and between opposing endwalls 52A, 52B (generally referred to as "52") of the core structure 38A, 38B; e.g., see FIG. 7. The walls 42 may be arranged generally parallel with one another. The walls 42 are transversely spaced from one another so as to respectively form the cavities 48 transversely between adjacent walls 42. With this configuration, transversely adjacent cavities 48 (e.g., cavities in transversely adjacent arrays 50) are also fluidly separated from one another by a respective one of the walls 42.

Each of the walls 42 may also be connected (e.g., bonded and/or otherwise) to the first skin 22 and/or the second skin 24 (see FIGS. 2 and 3). Each of the walls 42 is orientated substantially perpendicular to the first skin 22 and the second skin 24. However, in other embodiments, one or more of the walls 42 may be offset from the first skin 22 and/or the second skin 24 by a non-ninety degree angle; e.g., an acute included angle.

Figure 5:
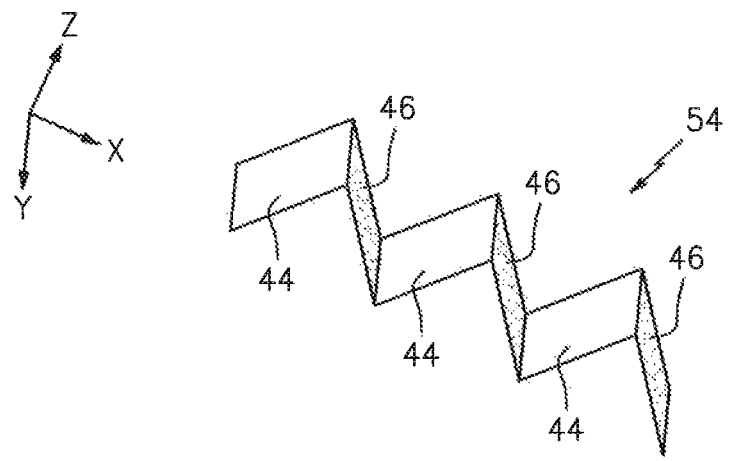
FIG. 5 is a perspective illustration of a corrugated ribbon.

The baffles 44 and the septums 46 are arranged in a plurality of corrugated ribbons 54. An exemplary embodiment of such a corrugated ribbon 54 is shown in FIG. 5. This corrugated ribbon 54 may be configured as a (e.g., monolithic) corrugated body, which may be continuous vertically between the first skin 22 and the second skin 24 as well as continuous extending longitudinally along a set of the cavities 48. Each corrugated ribbon 54 includes a plurality of the baffles 44 and a plurality of the septums 46. The baffles 44 in each corrugated ribbon 54 are interdisposed with the respective septums 46. More particularly, each of the baffles 44 (unless configured at a longitudinal end of the ribbon 54) is disposed and may extend longitudinally between a respective adjacent pair of the septums 46. Similarly, each of the septums 46 (unless configured at a longitudinal end of the ribbon 54) is disposed and may extend longitudinally between a respective adjacent pair of the baffles 44.

Referring to FIG. 2, one end 56 of each of the baffles 44 is vertically engaged with and/or connected to the first skin 22. An opposing end 58 of each of the baffles 44 is vertically engaged with and/or connected to the second skin 24. Thus, each of the baffles 44 may be angularly offset from the first skin 22 and the second skin 24 by an angle 60; e.g., an acute angle or other (e.g., ninety degree) angle. Similarly, one end 62 of each of the septums 46 is vertically engaged with and/or connected to the first skin 22. An opposing end 64 of each of the septums 46 is vertically engaged with and/or connected to the second skin 24. Thus, each of the septums 46 may be angularly offset from the first skin 22 and the second skin 24 by an angle 66; e.g., an acute angle or other (e.g., ninety degree) angle. In this manner, each corrugated ribbon 54 has a corrugated configuration (see FIG. 5), where one of the baffles 44 and one of the septums 46 may form a single corrugation. Of course, in other embodiments, one or more of the corrugations may each include at least one additional element; e.g., a bridge.

Figure 6:
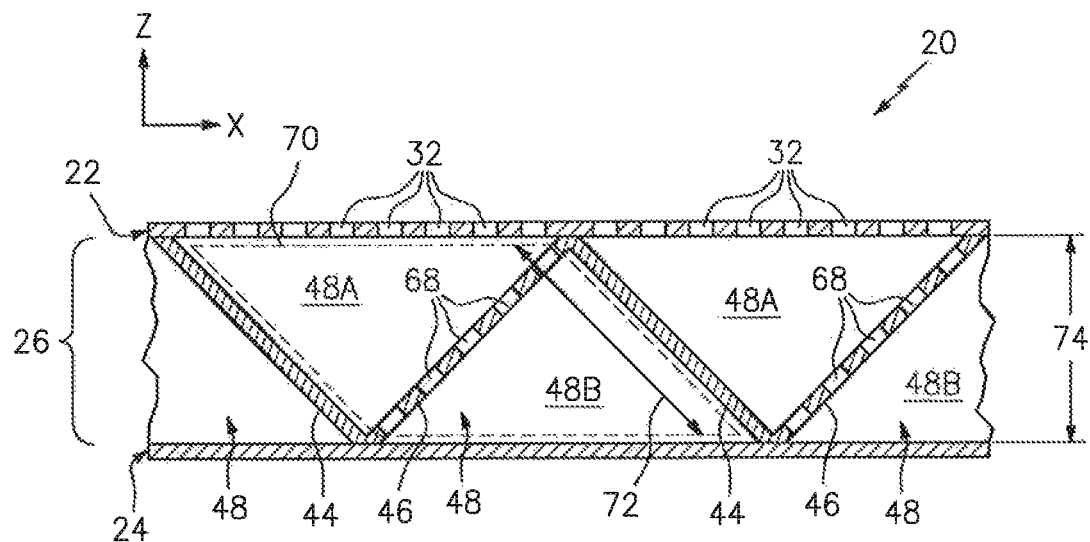
FIG. 6 is another sectional illustration of the structural panel portion of FIG. 2.

Referring to FIG. 6, each of the cavities 48 extends longitudinally between and is formed by an adjacent pair of the baffles 44. Each cavity 48 extends vertically between and formed by the first skin 22 and the second skin 24. Each septum 46 is disposed within and divides a respective one of the cavities 48 into fluidly coupled sub-cavities 48A and 48B. One or more perforations 68 in the septum 46 fluidly couple the sub-cavities 48A and 48B together.

With the foregoing core configuration, each of the cavities 48 forms a resonance chamber 70. A length 72 of the resonance chamber 70 extends diagonally between the first skin 22 and the second skin 24 and through a respective one of the septums 46. The effective acoustic length of the resonance chamber 70 therefore is longer than a vertical thickness 74 of the multi-segment core 26. This enables noise attenuation of relatively low frequency noise without increasing the vertical thickness 74 of the structural panel 20. For example, each resonance chamber 70 may receive noise waves through the perforations 32 in the first skin 22. The resonance chamber 70 may reverse the phase of one or more frequencies of those sound waves using known acoustic resonance and noise cancellation principles and subsequently direct the reverse phase sound waves out of the structural panel 20 through the perforations 32 to destructively interfere with other incoming noise waves.

Figure 7:
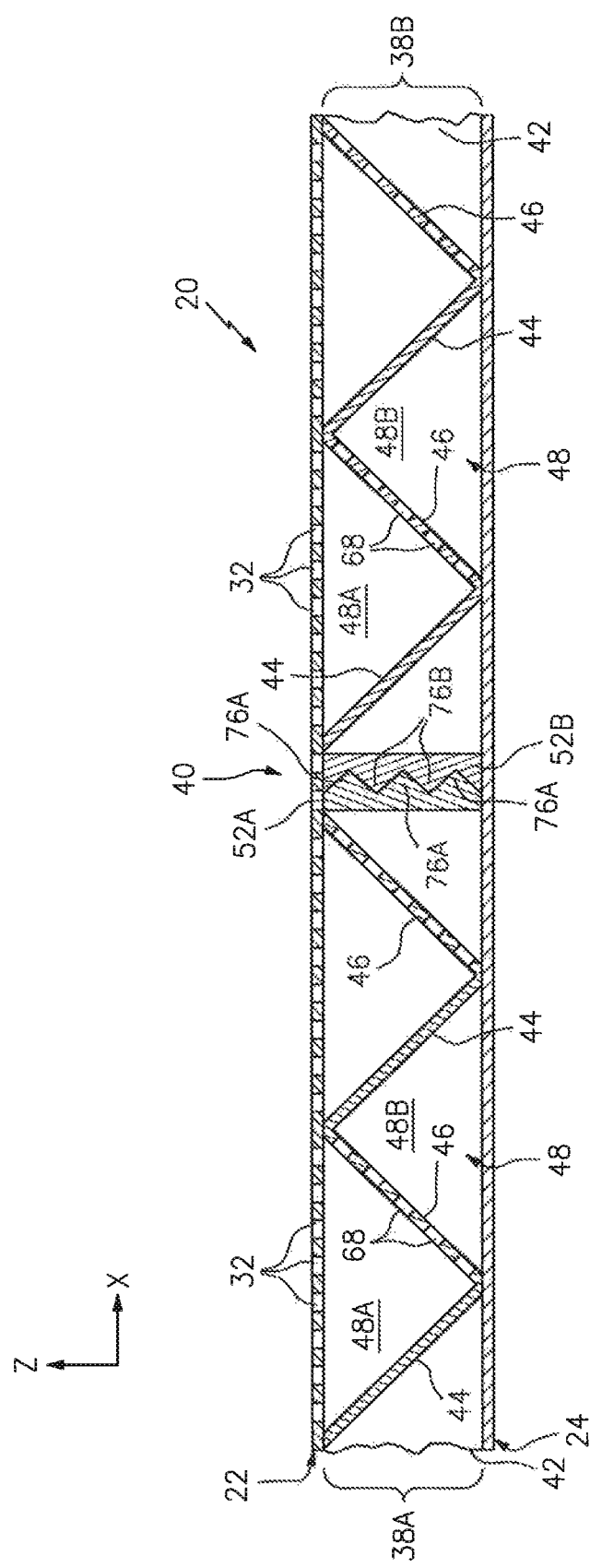
FIG. 7 is a sectional illustration of a splice joint between two core structures in the structural panel.
Figure 8:
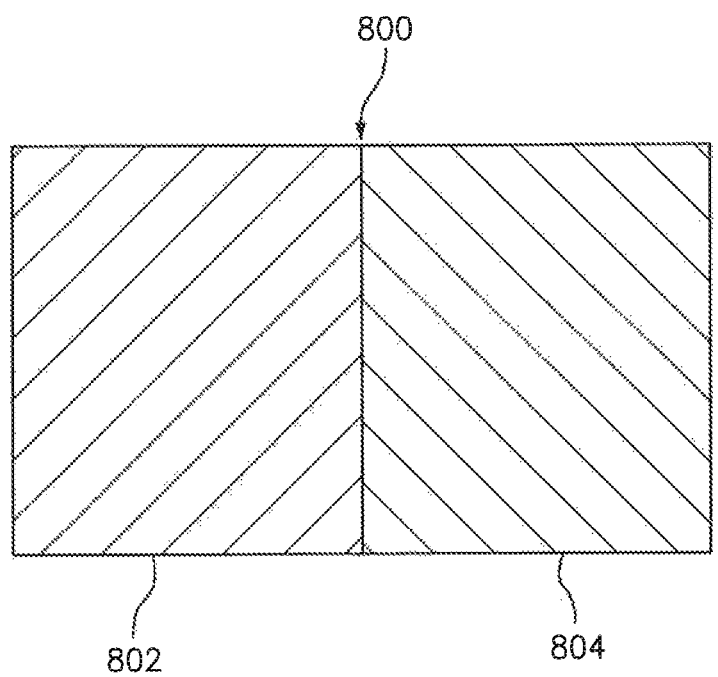
FIG. 8 is a schematic illustration of a butt joint between two core structures.

FIG. 7 is an illustration of an embodiment of the splice joint 40 between the first core structure 38A and the second core structure 38B. This splice joint 40 of FIG. 7 is a complex splice joint. Herein, the term "complex splice joint" is used to describe a splice joint with meshing, interlocking and/or otherwise mating features. By contrast, a simple splice joint such as a butt joint 800 as shown in FIG. 8 does not include such mating features.

Referring again to FIG. 7, the first core structure 38A is laterally (e.g., longitudinally, or alternatively transversely) bonded to the second core structure 38B at the splice joint 40 between the endwall 52A of the first core structure 38A and the endwall 52B of the second core structure 38B. Briefly, each endwall 52 defines a respective longitudinal end of and forms a distal perimeter wall of the core structure 38. Each endwall 52 extends vertically between and is bonded to the first skin 22 and the second skin 24. Each endwall 52 may extend transversely along an entire length of the respective longitudinal end of the core structure 38.

Each endwall 52 of FIG. 7 includes one or more protrusions 76A, 76B (generally referred to as "76") and one or more recesses (e.g., channels, grooves). The protrusions 76 are arranged in a vertically extending array; e.g., a vertical stack. Each of the protrusions 76 may extend transversely along the entire length of the respective longitudinal lateral end of the core structure 38. Each of the protrusions 76 is vertically spaced from adjacent protrusion(s) 76, thereby defining a respective one of the recesses vertically therebetween.

The protrusions 76A of the endwall 52A are configured to mate (e.g., mesh and interlock) with the protrusions 76B of the endwall 52B. More particularly, the protrusions 76A of the endwall 52A are configured to project into the recesses of the endwall 52B. The protrusions 76B of the endwall 52B are configured to project into the recesses of the endwall 52A. Thus, each protrusion 76A on the endwall 52A is vertically adjacent and engages (e.g., contacts) at least one protrusion 76B on the endwall 52B, and vice versa. With this meshed arrangement, vertical contact pressure may be applied to the core structures 38A and 38B at the splice joint 40 during bonding to ensure a strong structural bond between the endwalls 52A and 52B and, thus, the core structures 38A and 38B. In addition, the meshed arrangement enables the splice joint 40 to withstand higher shear loads than the simple splice joint 800 between components 802 and 804 as shown in FIG. 8.

Figure 9:
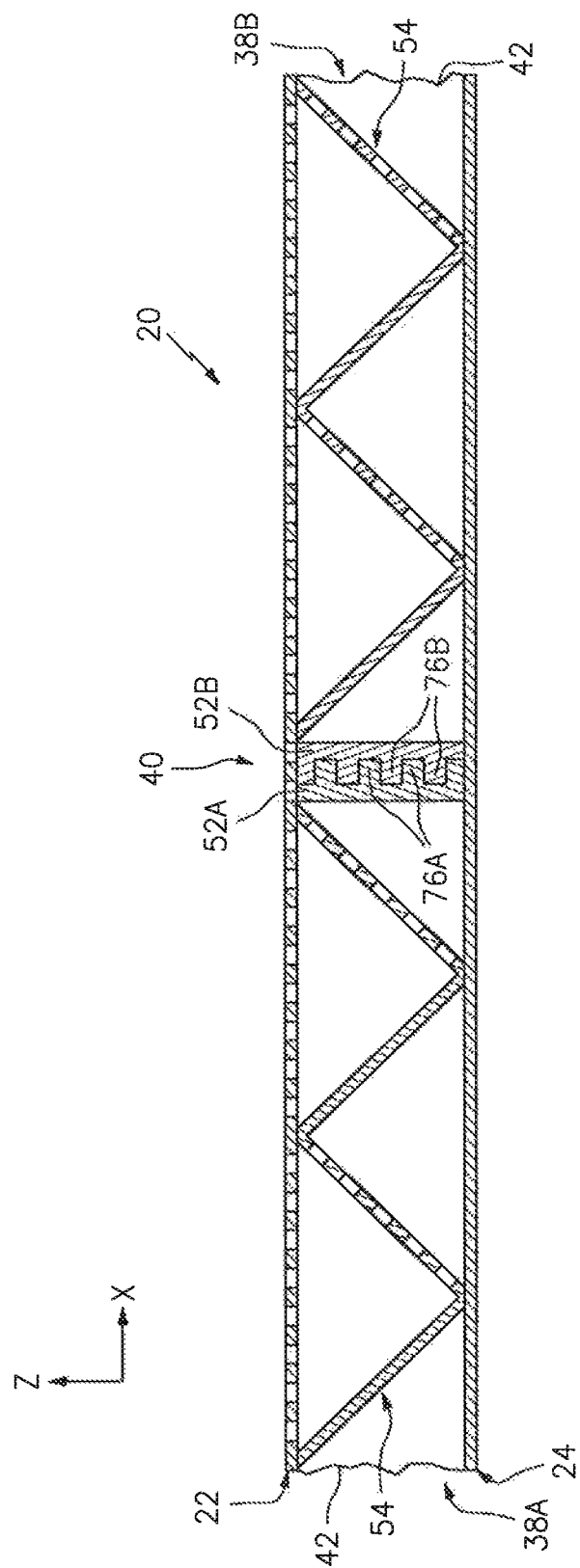
FIGS. 9-12 are sectional illustrations of alternative splice joints between respective core structures in the structural panel.

In some embodiments, referring to FIG. 7, one or more of the protrusions 76 may each have a triangular sectional geometry, for example, when viewed in the longitudinal-vertical (e.g., x-z) plane. In other embodiments, referring to FIG. 9, one or more of the protrusions 76 may each have a rectangular sectional geometry, for example, when viewed in the longitudinal-vertical (e.g., x-z) plane. The present disclosure, however, is not limited to the foregoing exemplary protrusion sectional geometries. For example, in other embodiments, one or more of the protrusions 76 may have a semi-circular geometry. Furthermore, while the protrusions 76 shown in FIGS. 7 and 9 on each endwall 52 have the same sectional geometry, at least one protrusion 76 on a respective endwall 52 may have a different sectional geometry than another protrusion 76 on that same endwall 52.

Figure 10:
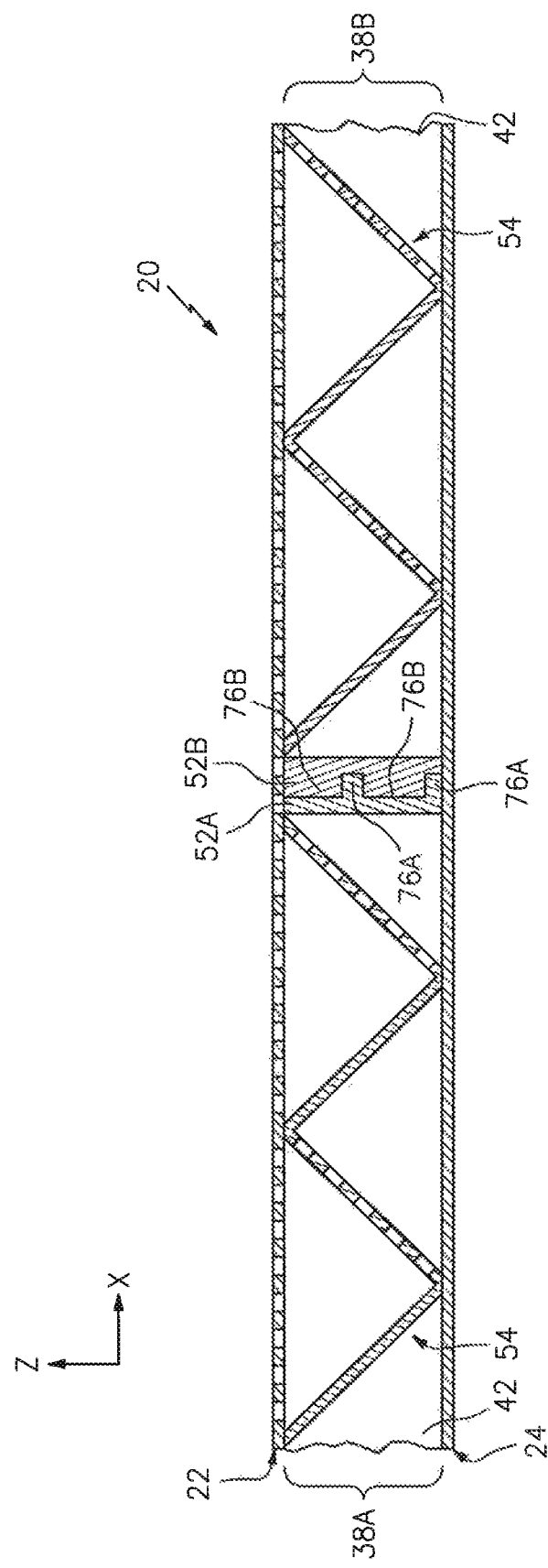

In some embodiments, referring to FIGS. 7 and 8, the sectional geometry of one or more of the protrusions 76A on the endwall 52A may substantially be mirror images of the sectional geometry of one or more of the protrusions 76B on the endwall 52B. In other embodiments, referring to FIG. 10, the sectional geometries of the protrusions 76A on the endwall 52A may be different than (e.g., not mirror images of) the sectional geometries of the protrusions 76B on the endwall 52B.

Figure 11:
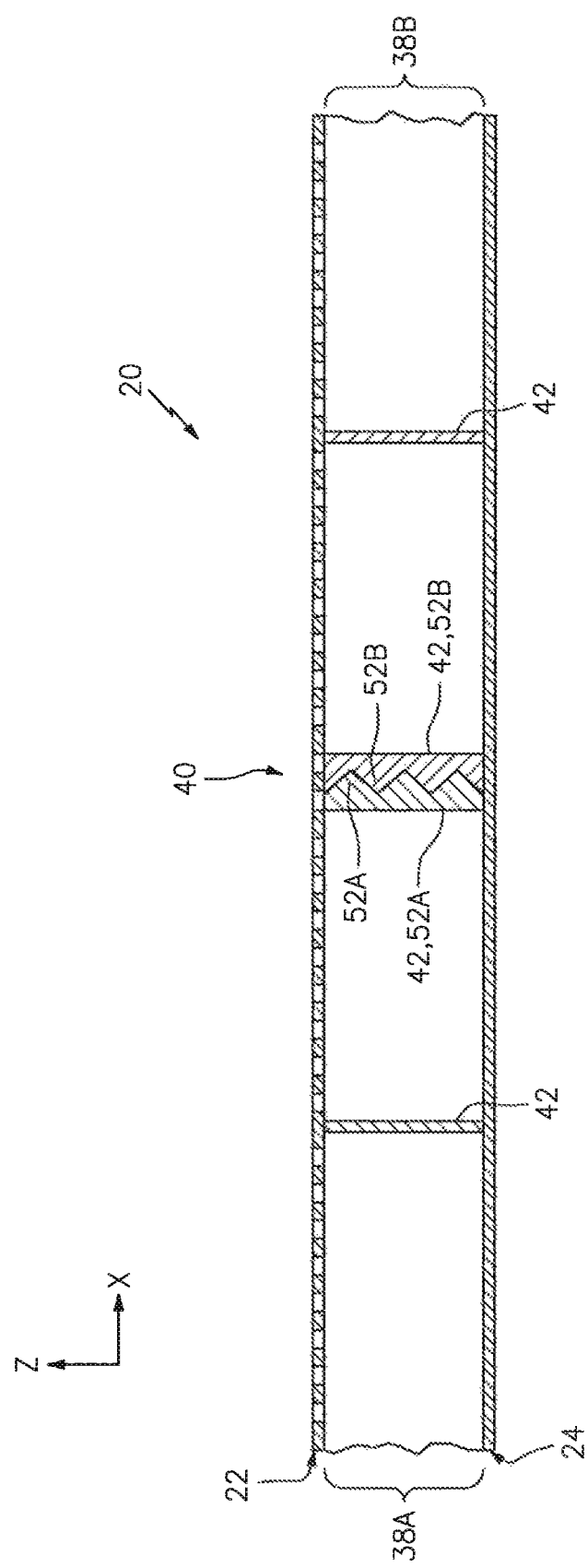
Figure 12:
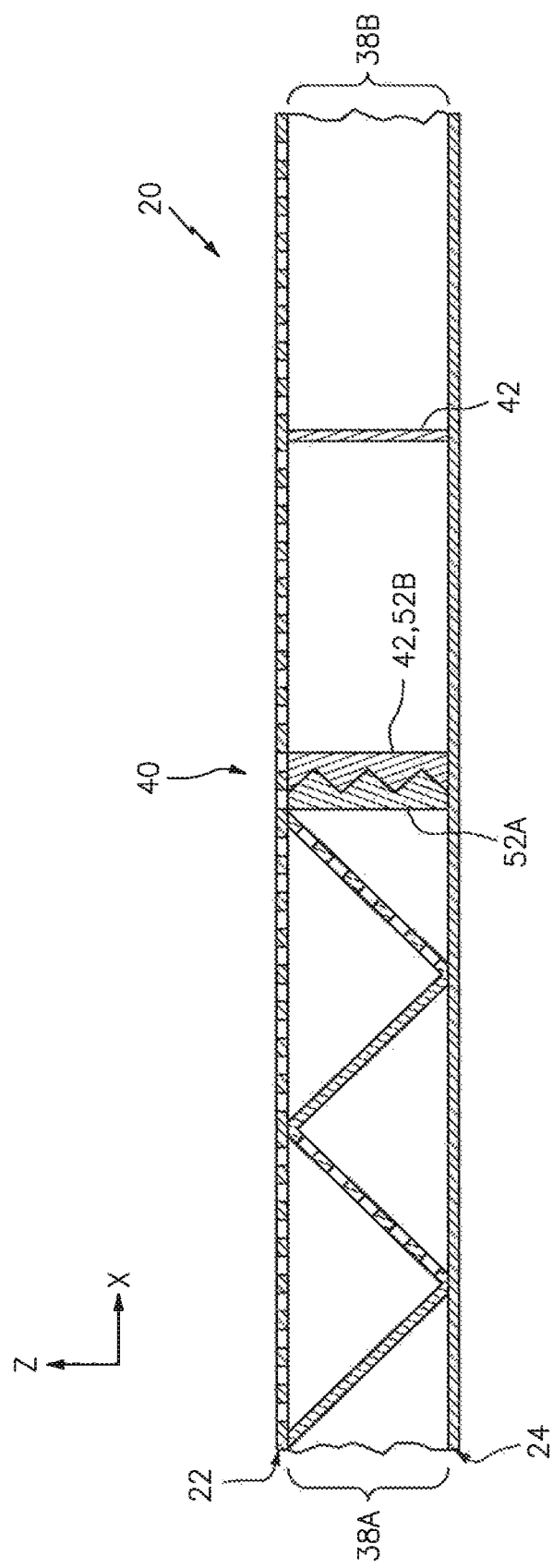

While the splice joint 40 is described above at a longitudinal interface between the first core structure 38A and the second core structure 38B, such an interface may also or alternatively be a transverse bonded interface as shown in FIG. 11. In such an embodiment, the endwalls 52 also function as the transverse end walls 42. In still other embodiments, the first core structure 38A and the second core structure 38B may have different orientations as shown in FIG. 12.

Each core structure 38 described above may be formed from thermoplastic material as a unitary (e.g., monolithic) body. However, the present disclosure, is not limited to such a core structure material or unitary configuration. For example, in other embodiments, one or more of the core structures 38 may also or alternatively each be formed from or otherwise include metal, another polymer (e.g., e.g., thermoset), fiber reinforced composite (e.g., fiberglass composite, carbon fiber composite, aramid fiber composite, etc.), or a combination thereof. In another example, some of the components of the core structure may be formed as discrete bodies and then attached to one another after formation.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A structural panel, comprising:
a first core structure configured with a first endwall and a plurality of first cavities that extend vertically through the first core structure; and
a second core structure configured with a second endwall and a plurality of second cavities that extend vertically through the second core structure;
the second core structure laterally bonded to the first core structure at a complex splice joint between the first endwall and the second endwall;
the first endwall comprising a first protrusion that extends laterally into a first recess in the second endwall; and
the second endwall comprising a second protrusion that extends laterally into a second recess in the first endwall, wherein the second protrusion is vertically displaced from the first protrusion.

2. The structural panel of claim 1, wherein the second protrusion is vertically adjacent and engages the first protrusion.

3. The structural panel of claim 1, wherein the first protrusion has a first sectional geometry, and the second protrusion has a second sectional geometry that is substantially a mirror image of the first sectional geometry.

4. The structural panel of claim 1, wherein the first protrusion has a first sectional geometry, and the second protrusion has a second sectional geometry that is different than the first sectional geometry.

5. A structural panel, comprising:
a first core structure configured with a first endwall and a plurality of first cavities that extend vertically through the first core structure; and
a second core structure configured with a second endwall and a plurality of second cavities that extend vertically through the second core structure;
the second core structure laterally bonded to the first core structure at a complex splice joint between the first endwall and the second endwall;
the first endwall comprising a first protrusion that extends laterally into a first recess in the second endwall; and
the first endwall further comprising a second protrusion that extends laterally into a second recess in the second endwall, wherein the second protrusion is vertically displaced from the first protrusion.

6. The structural panel of claim 1, wherein the first protrusion has a rectangular sectional geometry.

7. The structural panel of claim 1, wherein the first protrusion has a triangular sectional geometry.

8. The structural panel of claim 1, wherein at least one of the first endwall or the second endwall comprises thermoplastic material.

9. The structural panel of claim 1, wherein at least one of the first core structure or the second core structure is configured as a unitary body.

10. The structural panel of claim 1, further comprising:
a first skin comprising a plurality of perforations;
a second skin; and
a core vertically between and connected to the first skin and the second skin, the core including the first core structure and the second core structure;
wherein the first cavities extend vertically through the first core structure between the first skin and the second skin, and at least one of the first cavities is fluidly coupled with one or more of the perforations in the first skin; and
wherein the second cavities extend vertically through the second core structure between the first skin and the second skin, and at least one of the second cavities is fluidly coupled with one or more of the perforations in the first skin.

11. The structural panel of claim 1, wherein
the second core structure is laterally bonded, in a first direction, to the first core structure at the complex splice joint;
the first core structure further includes a corrugated ribbon, a first wall and a second wall;
the corrugated ribbon includes a plurality of baffles and a plurality of porous septums;

the baffles and the porous septums are laterally, in a second direction, between and connected to the first wall and the second wall;

each of the porous septums is laterally, in the first direction, between a respective adjacent pair of the baffles; and the corrugated ribbon, the first wall and the second wall each extend laterally, in the first direction, to and is connected to the first endwall.

12. The structural panel of claim 1, wherein the second core structure is laterally bonded, in a first direction, to the first core structure at the complex splice joint;

the first core structure further includes a corrugated ribbon and a first wall;

the corrugated ribbon includes a plurality of baffles and a plurality of porous septums;

the baffles and the porous septums are laterally, in a second direction, between and connected to the first endwall and the first wall; and each of the porous septums is laterally, in the first direction, between a respective adjacent pair of the baffles.

13. The structural panel of claim 1, wherein the structural panel is configured as an acoustic panel of an aircraft propulsion system nacelle.

14. A structural panel, comprising:

a first core structure comprising a first endwall and a plurality of first cavities that extend vertically through the first core structure, the first endwall configured with a plurality of first protrusions arranged in a vertically extending array; and a second core structure comprising a second endwall and a plurality of second cavities that extend vertically through the second core structure, the second endwall configured with a plurality of second protrusions arranged in a vertically extending array;

wherein the second protrusions are meshed together with the first protrusions at a splice joint that laterally attaches the second core structure to the first core structure.

15. The structural panel of claim 14, further comprising:

a first skin comprising a plurality of perforations;

a second skin; and a core vertically between and connected to the first skin and the second skin, the core including the first core structure and the second core structure;

wherein the first cavities extend vertically through the first core structure between the first skin and the second skin, and at least one of the first cavities is fluidly coupled with one or more of the perforations in the first skin; and wherein the second cavities extend vertically through the second core structure between the first skin and the second skin, and at least one of the second cavities is fluidly coupled with one or more of the perforations in the first skin.

16. The structural panel of claim 14, wherein the first core structure further includes a corrugated ribbon, a first wall and a second wall;

the corrugated ribbon includes a plurality of baffles and a plurality of porous septums;

the baffles and the porous septums are between and connected to the first wall and the second wall; and each of the porous septums is laterally between a respective adjacent pair of the baffles.

17. The structural panel of claim 14, wherein a first of the first protrusions has a triangular sectional geometry.

18. The structural panel of claim 14, wherein at least one of the first core structure or the second core structure is configured as a monolithic body.

* * * * *